United States Patent
Bueschelberger et al.

(10) Patent No.: US 6,707,975 B2
(45) Date of Patent: Mar. 16, 2004

(54) FIBER OPTIC COIL FOR A FIBER OPTIC MEASURING SYSTEM AND METHOD FOR PRODUCING THE SAME

(75) Inventors: Hanns J. Bueschelberger, Kirchzarten (DE); Hans G. Mueller, Hartheim (DE); Felix Ruh, Freiburg (DE); Claus Voelker, Glottertal (DE); Anja Weiner Ringwald née Weiner, Herbolzheim (DE)

(73) Assignee: LITEF GmbH, Freiburg im Breisbau (DE)

( * ) Notice: Subject to any disclaimer, the term of this patent is extended or adjusted under 35 U.S.C. 154(b) by 145 days.

(21) Appl. No.: 10/070,840

(22) PCT Filed: May 11, 2001

(86) PCT No.: PCT/EP01/05414

§ 371 (c)(1),
(2), (4) Date: Mar. 11, 2002

(87) PCT Pub. No.: WO02/04892

PCT Pub. Date: Jan. 17, 2002

(65) Prior Publication Data

US 2002/0122643 A1 Sep. 5, 2002

(30) Foreign Application Priority Data

Jul. 11, 2000 (DE) .......................... 100 33 541

(51) Int. Cl.[7] .............................. G02B 6/02; G01C 19/72
(52) U.S. Cl. ..................... 385/123; 385/134; 356/465
(58) Field of Search .................. 385/12, 123, 124, 385/128, 134, 137, 147; 356/465; 242/520

(56) References Cited

U.S. PATENT DOCUMENTS

| | | | |
|---|---|---|---|
| 4,781,461 A | 11/1988 | Baron et al. | |
| 4,856,900 A | 8/1989 | Ivancevic | |
| 5,546,482 A | 8/1996 | Cordova et al. | |
| 5,917,983 A | 6/1999 | Page et al. | |
| 6,211,963 B1 * | 4/2001 | Kaliszek et al. | 356/465 |

FOREIGN PATENT DOCUMENTS

| | | |
|---|---|---|
| DE | 3632730 | 4/1988 |
| EP | 0614518 | 9/1994 |
| EP | 0694760 | 1/1996 |
| EP | 0874219 | 10/1998 |
| JP | 6333612 | 7/1988 |
| JP | 1305310 | 2/1990 |

OTHER PUBLICATIONS

Bergh, "All–Fiber Gyroscope With Optical–Kerr–Effect Compensation," G.L. Report No. 3586, Stanford University (1983).

Dyott, "Reduction of the Shupe Effect in Fibre Optic Gyros; The Random–Wound Coil," Electronics Letters, vol. 32, No. 23, (Nov. 7, 1956), pp. 2177, 2178.

* cited by examiner

Primary Examiner—Frank G. Font
Assistant Examiner—Michael P. Mooney
(74) Attorney, Agent, or Firm—Elliott N. Kramsky

(57) ABSTRACT

An optical fiber coil for a fiber-optic measuring device and a method for producing it. An opitcal fiber is applied to a winding body in a quadrupole winding pattern in directly successive winding layers such that the turns of the individual winding layers have, at irregular spacings, as large a number of crossover points as possible. The spacings between the individual turns in each winding layer are variable, but, on average, they correspond to approximately half the diameter of the optical fiber. The optical fiber coil is preferably applied to the winding body without the use of fixing and buffer means.

6 Claims, 2 Drawing Sheets

FIBER OPTIC COIL FOR A FIBER OPTIC MEASURING SYSTEM AND METHOD FOR PRODUCING THE SAME

The invention relates to an optical fiber coil for a fiber-optic measuring device, in particular a fiber-optic Sagnac interferometer, and to a method for producing it.

Optical fiber coils for fiber-optic measuring devices, in particular sensor coils for Sagnac interferometers such as fiber-optic rate-of-rotation sensors have the task of recording an optical phase shift between two light waves propagating therein in opposite directions in accordance with the teaching of the Sagnac effect, and of permitting its measurement by means of a photoelectric measuring device. Measuring devices of this type are known and are denoted in general, and therefore also in brief below, as interferometers and, in said narrower sense, as fiber gyros.

In practice, disturbing side effects are superimposed on the measuring signal of such an interferometer. Non-reciprocal variations in the light path inside the fiber coil, in particular, lead to zero shifts of the interferometer, and thus to incorrect measurements by the rate-of-rotation sensor, for example. Sensitivity to temperature transients along the optical fiber are to be mentioned here, in particular. This effect is denoted after its discoverer as the Shupe effect (compare Shupe; Appl. Opt. 19(5), pages 654–655 (1980)). During a variation in the ambient temperature and, as a result thereof, a change in the temperature profile inside the optical fiber, a zero error proportional to the rate of temperature change occurs which leads in the case of rate-of-rotation sensors to unacceptable inaccuracies, at least starting from a certain quality class.

A number of measures have already been described or proposed for holding down the abovementioned effect of temperature changes. The core of these measures was generally to fashion the thermal conduction in the optical fiber of the sensor coil in a symmetrical way. Specifically, the theoretical description of the Shupe effect teaches that the reciprocity error occurs only when segments that are at an equal distance from the center of the total length of the optical fiber are subjected to unequal temperature influences. This finding has led to structural measures aimed at designing the arrangement of the optical fiber, wound up to form a coil, with the greatest possible thermal symmetry. It is what is termed the quadrupole winding technique (compare Bergh: G. L. Report No. 3586, Stanford University 1983, U.S. Pat. Nos. 4,781,461, 4,856,900, JP-Patent Abstracts of Japan: 63–33612 A, P-727, Jul. 8, 1988, Vol. 12, No. 240 and 1-305310 A, P-1012, Feb. 23, 1990, Vol. 14, No. 101) or what is termed the oktupole winding technique (compare EP 0 614 518) that has chiefly become known. In these winding techniques, the turns of the optical fiber are laid precisely next to one another in each winding layer; crossovers and gaps between the individual fiber turns are to be avoided by a very precise and comparatively expensive winding technique. Other approaches to the solution as are described, for example, in EP 0 694 760 and U.S. Pat. No. 5,546,482 require each winding layer to be embedded in an elastic buffer material.

In these known methods for reducing the nonreciprocal variations in the light path caused by the Shupe effect, fundamental system-induced problems continue to arise, however: starting from the second winding layer, the gradient of the optical fiber from turn to turn does not occur in a uniform spiral. The fibers are laid in the grooves formed by the layer situated therebelow. Since the gradient changes its direction from layer to layer, a crossover must take place with each revolution. The locus of these crossovers is limited in a step fashion to a constricted space. As follows from the diagrammatic illustration of FIG. 3 in the attached drawing, the crossover region of all the turns of a layer is situated in a small angle segment δ, particularly for a desired narrow layer winding. The high demands placed on the precision of the coil winding entail complicated winding methods and correspondingly expensive winding equipment. It must chiefly be taken into account in this case that, because of its material properties, the glass fiber used as optical conductor has an inherent elastic tension which tends to bring the fiber into a preferred position, generally stretched. Bending or torsional stresses inside the fiber can lead to the fiber lying on a winding body in an undulating manner. This waviness can lead, in turn, to crossovers or gaps between the turns within a layer. For an automatic winding, these risks constitute a high outlay on machinery and a high level of expert knowledge and skill from the production staff if such faults are to be avoided.

In order to reduce nonreciprocity errors due to the Shupe effect, De 36 32 730 C2 has already disclosed the proposal of avoiding bending losses at crossovers by providing a winding with only one layer which distributes or mixes turns randomly and are then fixed in a specific volume with the aid of an adhesive, the winding core being subsequently removed. Apart from the fact that this type of winding technique leads unavoidably to coils of large volume, investigations have shown that the avoidance of bending losses, although leading to an improvement in nonreciprocal phase errors, cannot eliminate the Shupe effect problem.

If, in accordance with a proposal by Dyott, the opposite way is adopted and the turns are randomized not only in the axial, but also in the radial direction, the winding pattern no longer exhibits any layer winding and, in order to achieve a coil of low volume, it is necessary for the fiber winding disk to be held together with the aid of a fixing means, at least whenever, in accordance with the proposal by Dyott, a coil former is to be dispensed with (compare R. B. Dyott: Reductilon of the Shupe effect in fiberoptic gyros; the random-wound coil, Electronics Letters, Nov. 7, 1996, vol. 32, no. 23, pages 2177 and 2178).

Although it can be produced relatively easily in terms of method, by comparison with the quadrupole winding technique, as it is currently applied in the various method variants mentioned above, this winding applied by random distribution cannot lead to a sufficient improvement in the zero drift in the case of fiber gyros which are to be operated with high accuracy on the basis of a prescribed specification in the temperature range of, for example, −55° C. to +80° C.

It is therefore the object of the invention to provide optical fiber coils for fiber-optic Sagnac interferometers and a method for producing them which are distinguished by outstanding freedom from zero drift within prescribed temperature limits and rates of temperature change.

According to the invention the invention is characterized, in the case of a method for producing an optical fiber coil for a fiber-optic measuring device, in that in order to reduce nonreciprocal variations in the light path, in the fiber coil during winding of the same, the optical fiber is applied to a winding body in a quadrupole winding pattern in directly successive winding layers such that the turns in the individual winding layers have, at irregular spacings, as large a number of crossover points as possible.

The optical fiber coil is preferably wound such that the generally irregular spacings between the individual turns correspond on average approximately to half the diameter of the optical fiber.

An optical fiber coil for a fiber-optic Sagnac interferometer is furthermore, characterized in accordance with the invention by a winding body to which the optical fiber is applied in directly successive winding layers in a quadrupde winding pattern with a plurality of irregularly spaced crossover points in the individual winding layers.

Within each winding layer, the turns preferably exhibit variable spacings, but in such a way that, when averaged over an entire winding layer, these spacings correspond approximately to half the diameter of the optical fiber. It is possible to dispense with a fixing and/or buffer means, since this yields no further improvement in the temperature and cross-coupling response.

Detailed investigations into the influencing factors of tensile stress, arrangement of interlayers of a buffer or fixing means between the winding layers, and number of the fiber crossovers occurring on the sensitivity to temperature transients and the polarization cross-coupling, in particular in the case of polarization-maintaining optical fibers, has led, finally, to the optimal solution implemented by the invention.

Above all, the method according to the invention is characterized in that—by contrast with the prior assumptions and preconditions of the quadrupole winding technique—given a large number of crossovers of the optical fiber, there is a distinct improvement in the sensitivity to temperature transients in the direction of substantially smaller nonreciprocal phase shifts.

According to the invention, the winding is configured in this case such that the region in which the crossovers take place is not restricted to a small angular range of the coil, but rather that the locations of the crossovers are distributed over the entire extent of the coil. Furthermore, it has been established as characteristic of the invention that the factors of tensile stress and buffer layer, which have previously been regarded as significant influencing variables are of little significance for the favorable result obtained. If, in particular, the tensile stress applied during winding is kept in a range from approximately 10 cN to approximately 20 cN, the polarization cross-coupling between the intrinsic polarization modes of the optical fiber does not change significantly by the addition of omission of elastic buffer layers between the individual fiber layers. The factor of crossovers is of comparably little significance therefor.

It is important for the teaching according to the invention that fixing and/or buffer means are not required, since they do not improve the desired result. However, they do not impair it, either. It has merely been observed that when no adhesives are used the polarization cross-coupling can be degraded in the combination with high tensile stress, that is to say outside the previously mentioned range of approximately 10 to 20 cN.

With regard to the method for producing optical fiber coils with the desired properties, the object set is achieved according to the invention with the aid of following winding methods, which can be realized simply in terms of production engineering: a winding body is provided which has a flange at both axial ends. The basis is provided by the quadrupole winding pattern known inter alia, from the literature quoted above. In this case, the entire length of the fiber, which is to be wound onto a sensor coil, is wound firstly onto a dispenser coil. Half of the fiber length is now wound off from one dispenser coil onto a second dispenser coil. The sensor coil is then wound starting from the middle of the total fiber length. The first step in this process is to wind a layer from the first dispenser coil, and then a double layer from the first dispenser coil. Double layers are now alternately wound from the first or second dispenser coil onto the sensor coil to be produced, until the entire quantity of fiber located on the dispenser coils is used up. In order to produce many irregular fiber crossovers, the gradient of the winding is set such that a gap of approximately 50% of the fiber diameter arises in each case between two turns. A certain waviness of the fiber leads to a variable spacing between neighboring turns, but in such a way that on average the spacings over a winding layer correspond approximately to half the diameter of the optical fiber. During winding, the fiber is not forced into a prescribed position by positive guidance as previously employed. The turns of a layer situated therebelow fall into the gap thus formed. The positions of the turns of the layer located therebelow can be displaced in this case such that the gap spacings become variable or irregular. The pattern produced in this way becomes random starting from the third layer. Irregular crossovers occur. In accordance with the invention, there is no need for fixing or buffer means to separate the winding layers. The relatively close mutual penetration of the winding layers thereby achieved leads to a more uniform thermal distribution of fiber sections respectively equally spaced from the midpoint of the coil.

The method according to the invention does not require, on a conventional automatic winding machine, any device for applying and for curing a fixing means. It is likewise possible to eliminate exact control of the individual fiber positions. The previously unavoidable complexity of the winding machines required for producing such fiber coils can be drastically reduced.

The invention and advantageous details are explained below in more detail with reference to the drawing in an exemplary embodiment. In the drawing.

Figure 1:
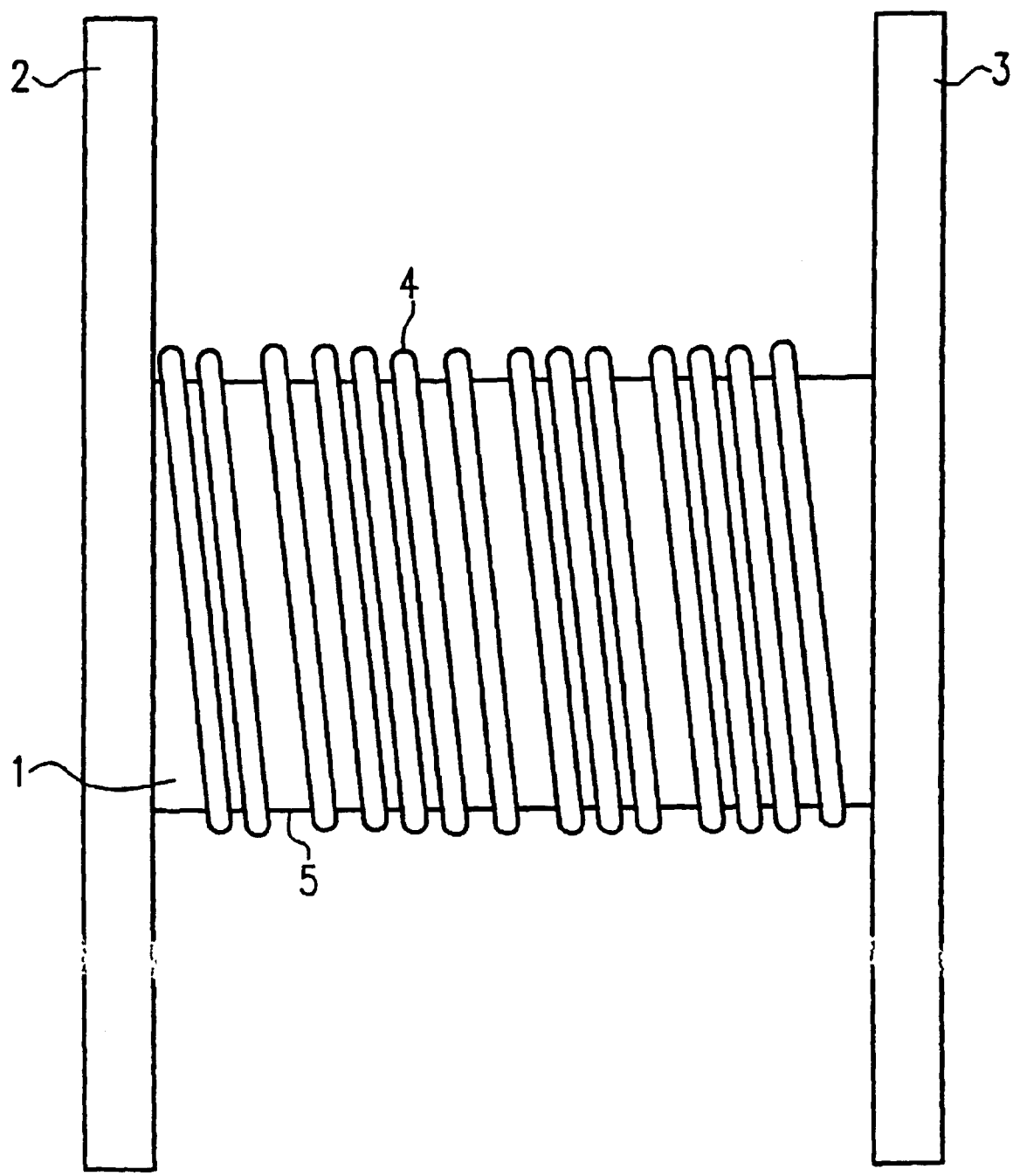
FIG. 1 shows a winding body with turns of an optical conductor.
Figure 2:
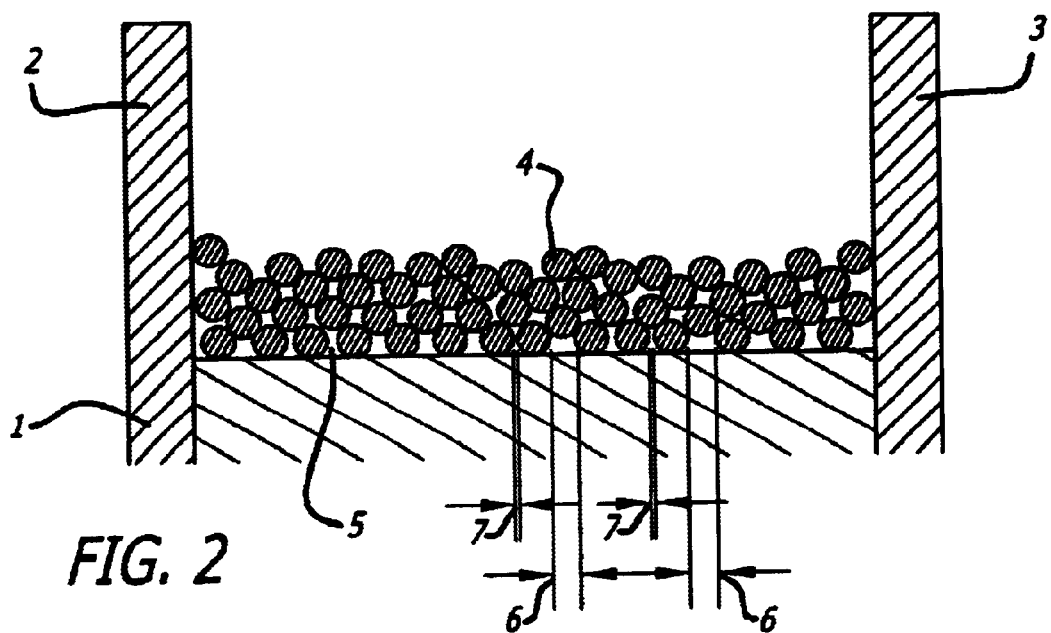
FIG. 2 shows a section through the center plane of a coil with a winding body.
Figure 3:
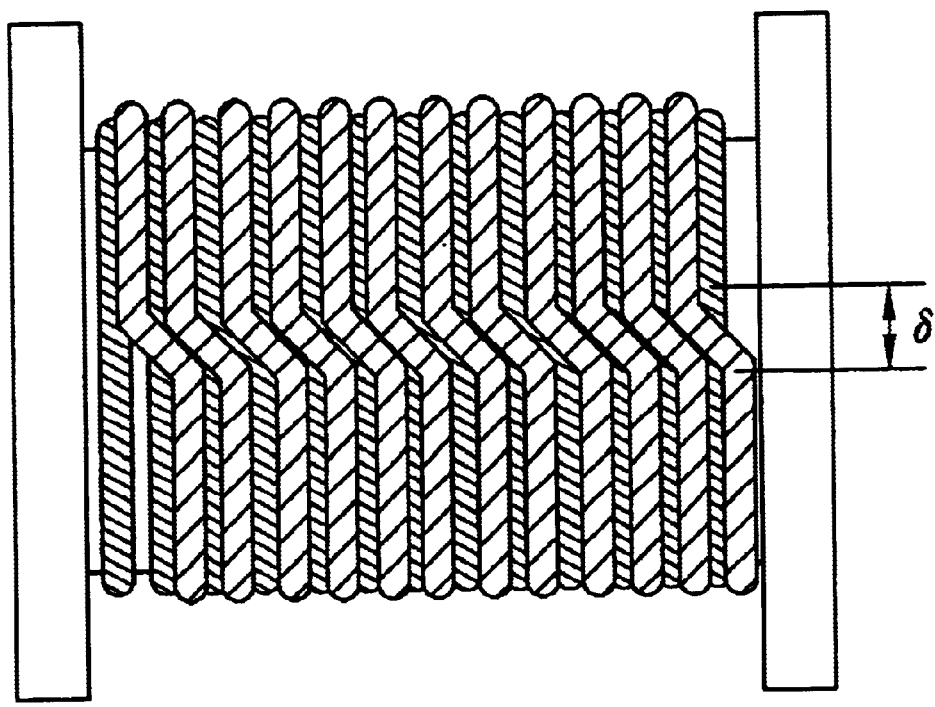
FIG. 3 shows a known optical fiber coil in the case of which the crossover of oppositely wound layers are situated in a narrow winding range when a narrow layer winding is applied.

FIG. 1 illustrates a winding body 1 with flanges 2 and 3 at the ends. Turns of an optical fiber 4 are applied to the winding body 1, the illustrated turns of the lowest layer being at a large spacing from one another. As may be seen from FIG. 2, the turns of a second layer of the optical fiber 4 come to lie in the interspaces 5 of the first layer. In this case, the turns of the lower layer are displaced at various points marked by the reference numeral 6 in such a way that the interspaces are enlarged. Consequently, the interspace is reduced in turn in relation to respectively neighboring turns 7. Starting from the third layer, a top surface of the overall winding is produced which can be characterized as an irregular winding shape.

It is important for the invention that the combined application of a quadrupole winding pattern using a coil body, and the application of the turns in winding layers at irregular spacings with as many crossover points as possible, specifically without the use of fixing or buffer means leads in this totality to a very substantial reduction in the nonreciprocal phase shifts and/or zero shifts, caused by the Shupe effect, of an interferometer equipped with such a fiber coil.

What is claimed is:

1. In a method for producing an optical fiber coil for a fiber optic measuring device of the type in which the fiber coil is formed by winding an optical fiber, the improvement comprising the step of applying said optical fiber to a winding body in a quadrupole winding pattern in successive winding layers so that the turns of individual winding layers have, at irregular spacings, as large a number of crossover points as possible whereby nonreciprocal variation is reduced in the light path formed by said fiber.

2. A method as defined in claim 1, wherein said optical fiber is wound in each winding layer such that said irregular spacings between the individual turns correspond, on average, to approximately half the diameter of said optical fiber.

3. An optical fiber coil of a fiber optic Sagnac interferometer, comprising, in combination:
  a) a winding body; and
  b) an optical fiber being applied to said winding body in directly successive winding layers in a quadrupole winding pattern with a plurality of irregularly-spaced crossover points in individual winding layers.

4. An optical fiber coil as defined in claim 3 further including:
  a) variable spacings being between turns of each winding layer; and
  b) said spacings corresponding, on average, to half the diameter of said optical fiber.

5. An optical fiber coil as defined in claim 3 wherein a first layer of turns of said optical fiber is applied directly to said winding body.

6. An optical fiber coil as defined in claim 3 further including a fixing or buffer means between said winding layers.

* * * * *